United States Patent
Kay et al.

(10) Patent No.: US 9,852,152 B2
(45) Date of Patent: Dec. 26, 2017

(54) METHOD FOR CONSISTENT STORAGE OF DATA IN AN INDUSTRIAL CONTROLLER

(71) Applicant: Rockwell Automation Technologies, Inc., Mayfield Heights, OH (US)

(72) Inventors: James J. Kay, Chardon, OH (US); David Allen Johnston, Mentor, OH (US); Shelly Lynn Urdaneta, Lyndhurst, OH (US); Stuart Blair Siegel, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/332,520

(22) Filed: Oct. 24, 2016

(65) Prior Publication Data
US 2017/0039221 A1    Feb. 9, 2017

Related U.S. Application Data

(60) Continuation of application No. 13/115,891, filed on May 25, 2011, now Pat. No. 9,495,368, which is a
(Continued)

(51) Int. Cl.
*G06F 17/30* (2006.01)
*H04L 29/06* (2006.01)
(Continued)

(52) U.S. Cl.
CPC ..... *G06F 17/30194* (2013.01); *G05B 19/042* (2013.01); *G05B 19/056* (2013.01);
(Continued)

(58) Field of Classification Search
CPC ........ G06F 17/30194; G06F 17/30079; H04L 67/1097; H04L 67/42
(Continued)

(56) References Cited

U.S. PATENT DOCUMENTS 3,234,433 A   2/1966   Braunagel
3,594,709 A   7/1971   Woertz
(Continued)

FOREIGN PATENT DOCUMENTS

DE   3516739 A1   11/1986
DE   4413836      10/1995
(Continued)

OTHER PUBLICATIONS

Moog. "TMC Improved Productivity with flexible System Technology", Sep. 1998, Moog GmbH, 8 pages.
(Continued)

*Primary Examiner* — Phong H Nguyen
(74) *Attorney, Agent, or Firm* — Amin, Turocy & Watson, LLP

(57) ABSTRACT

A system and method for employing a file system and file system services on the industrial controller. The file system allows industrial control programs to implement many functions previously performed within the industrial control program and stored in the same memory as the industrial control program. An execution engine is provided that interprets instructions included in an industrial control program. The instructions utilize services in the file system for including user defined routine files loaded from local or remote locations, to load and unload recipe files from local and remote locations, to log and retrieve measured data and trend data to files at local or remote locations, to select different operating systems and to select a running program from a plurality of running programs utilizing the file system.

20 Claims, 8 Drawing Sheets

Related U.S. Application Data continuation of application No. 11/381,321, filed on May 2, 2006, now abandoned, which is a division of application No. 10/924,230, filed on Aug. 23, 2004, now Pat. No. 7,065,415, which is a division of application No. 09/918,177, filed on Jul. 30, 2001, now Pat. No. 6,801,813.

(51) Int. Cl.
*H04L 29/08* (2006.01)
*G05B 19/042* (2006.01)
*G05B 19/05* (2006.01)

(52) U.S. Cl.
CPC .... *G06F 17/30079* (2013.01); *H04L 67/1097* (2013.01); *H04L 67/42* (2013.01); *G05B 2219/13076* (2013.01); *G05B 2219/15101* (2013.01); *G05B 2219/15115* (2013.01); *G05B 2219/23301* (2013.01); *G05B 2219/31457* (2013.01); *G05B 2219/34279* (2013.01)

(58) Field of Classification Search
USPC ........................................................ 707/827
See application file for complete search history.

(56) References Cited

U.S. PATENT DOCUMENTS

| | | |
|---|---|---|
| 3,624,333 A | 11/1971 | Schurr |
| 3,915,537 A | 10/1975 | Harris et al. |
| 4,135,226 A | 1/1979 | Kourimsky |
| 4,215,386 A | 7/1980 | Prager I, et al. |
| 4,228,483 A | 10/1980 | Haury et al. |
| 4,381,878 A | 5/1983 | Lechner et al. |
| 4,401,351 A | 8/1983 | Record |
| 4,516,189 A | 5/1985 | Seaks, Jr. |
| 4,558,914 A | 12/1985 | Prager II, et al. |
| 4,680,674 A | 7/1987 | Moore |
| 4,688,864 A | 8/1987 | Sorel |
| 4,736,340 A | 4/1988 | Desserrieres et al. |
| 4,738,632 A | 4/1988 | Schmidt et al. |
| 4,790,762 A | 12/1988 | Harms et al. |
| 4,858,070 A | 8/1989 | Buron et al. |
| 4,956,747 A | 9/1990 | Beer et al. |
| 4,969,083 A | 11/1990 | Gates |
| 4,983,126 A | 1/1991 | Busse et al. |
| 5,005,152 A | 4/1991 | Knutsen |
| 5,050,088 A | 9/1991 | Buckler et al. |
| 5,131,092 A | 7/1992 | Sackmann et al. |
| 5,168,441 A | 12/1992 | Onarheim et al. |
| 5,180,318 A | 1/1993 | Moller et al. |
| 5,247,693 A | 9/1993 | Bristol |
| 5,249,979 A | 10/1993 | Deinhardt et al. |
| 5,276,811 A | 1/1994 | Zifferer et al. |
| 5,295,059 A | 3/1994 | Brooks et al. |
| 5,319,783 A | 6/1994 | Zink et al. |
| 5,335,144 A | 8/1994 | Maroushek |
| 5,428,526 A | 6/1995 | Flood et al. |
| 5,472,347 A | 12/1995 | Nordenstrom et al. |
| 5,485,620 A | 1/1996 | Sadre et al. |
| 5,504,902 A | 4/1996 | McGrath et al. |
| 5,508,886 A | 4/1996 | Bernecker et al. |
| 5,508,909 A | 4/1996 | Maxwell et al. |
| 5,575,686 A | 11/1996 | Noschese |
| 5,576,946 A | 11/1996 | Bender et al. |
| 5,801,942 A | 9/1998 | Nixon et al. |
| 5,805,442 A | 9/1998 | Crater et al. |
| 5,809,230 A | 9/1998 | Pereira et al. |
| 5,862,054 A | 1/1999 | Li |
| 5,930,768 A | 7/1999 | Hooban |
| 5,949,673 A | 9/1999 | Struger et al. |
| 5,949,674 A | 9/1999 | Song et al. |
| 5,982,362 A | 11/1999 | Crater et al. |
| 6,055,632 A | 4/2000 | Deegan et al. |
| 6,061,603 A | 5/2000 | Papadopoulos et al. |
| 6,078,969 A | 6/2000 | Ichimura et al. |
| 6,079,016 A | 6/2000 | Park |
| 6,138,174 A | 10/2000 | Keeley |
| 6,201,996 B1 * | 3/2001 | Crater ................ G05B 19/0421 700/69 |
| 6,247,128 B1 | 6/2001 | Fisher et al. |
| 6,260,140 B1 | 7/2001 | McKeeth et al. |
| 6,263,487 B1 | 7/2001 | Stripf et al. |
| 6,363,422 B1 | 3/2002 | Hunter et al. |
| 6,442,442 B1 | 8/2002 | Weinhofer |
| 6,505,341 B1 | 1/2003 | Harris et al. |
| 6,580,953 B1 | 6/2003 | Wiebe et al. |
| 6,587,884 B1 | 7/2003 | Papadopoulos et al. |
| 6,615,091 B1 | 9/2003 | Birchenough et al. |
| 6,646,564 B1 | 11/2003 | Azieres et al. |
| 6,727,920 B1 | 4/2004 | Vineyard et al. |
| 6,779,110 B1 * | 8/2004 | Aguilar ................ G06F 9/4416 709/222 |
| 6,845,401 B1 | 1/2005 | Papadopoulos et al. |
| 7,257,523 B1 | 8/2007 | Nixon et al. |
| 7,272,815 B1 | 9/2007 | Eldridge et al. |
| 7,308,550 B2 | 12/2007 | Cornett et al. |
| 7,313,609 B1 | 12/2007 | Wischinski |
| 7,546,232 B2 | 6/2009 | Brooks et al. |
| 7,865,539 B2 * | 1/2011 | Talanis ............... G06F 17/30067 707/829 |
| 2001/0004738 A1 | 6/2001 | Howard |
| 2002/0032384 A1 * | 3/2002 | Raymond .......... A61B 5/02055 600/513 |
| 2002/0092011 A1 * | 7/2002 | Liu .......................... G06F 8/65 717/169 |
| 2002/0099454 A1 | 7/2002 | Gerrity |
| 2002/0109718 A1 * | 8/2002 | Mansour ............... G06F 9/4445 715/744 |
| 2002/0156926 A1 | 10/2002 | Batke et al. |
| 2002/0173860 A1 * | 11/2002 | Bruce .................. G01C 21/367 700/1 |
| 2002/0198824 A1 * | 12/2002 | Cook ..................... G06Q 40/00 705/38 |
| 2003/0009572 A1 | 1/2003 | Thurner et al. |
| 2003/0014322 A1 * | 1/2003 | Kreidler ............. G06Q 10/0637 705/7.36 |
| 2003/0195975 A1 | 10/2003 | Papadopoulos et al. |
| 2004/0073404 A1 | 4/2004 | Brooks et al. |
| 2010/0332149 A1 * | 12/2010 | Scholpp .................. C02F 1/008 702/25 |

FOREIGN PATENT DOCUMENTS

| | | |
|---|---|---|
| DE | 19812423 | 9/1999 |
| DE | 19835506 | 2/2000 |
| DE | 19929821 | 3/2000 |
| EP | 0075325 | 3/1983 |
| EP | 0236711 A2 | 9/1987 |
| EP | 0331060 | 9/1989 |
| EP | 0515797 A2 | 12/1992 |
| EP | 0586813 | 3/1994 |
| EP | 0619538 | 10/1994 |
| EP | 0717866 | 11/1997 |
| EP | 0643848 | 12/1998 |
| EP | 880730 | 12/1998 |
| EP | 0331060 | 8/1999 |
| EP | 1089150 | 4/2001 |
| EP | 1282020 | 2/2003 |
| EP | 630631 | 3/2006 |
| EP | 1282020 | 9/2013 |
| JP | 3129434 | 6/1991 |
| WO | 95/29454 | 11/1995 |
| WO | 9704367 | 2/1997 |
| WO | 9727540 | 7/1997 |
| WO | 9850834 | 11/1997 |
| WO | 98/53581 | 11/1998 |
| WO | 0052572 | 9/2000 |

(56) References Cited

FOREIGN PATENT DOCUMENTS

| WO | 150704 | 7/2001 |
|---|---|---|
| WO | 169332 | 9/2001 |

OTHER PUBLICATIONS

Moog. "TMC Setup Instructions" A 62266E Rev. A, Apr. 2, 1994, Moog GmbH, 108 pages.
Moog. "TMC Operating Instructions" A 62238E Rev. C, Moog GmbH, 199x, retrieved Jun. 4, 2014, 40 pages.
Microset. "MARS La nuova generazione di PLC" Magazine advertisement published in Automazione, Nov. 1996, 2 pages.
Alessandroni. "Sistemi Elettronici Per Automazione" Article published in Automazione, Dec. 1997, 7 pages.
Zecchi. "Un'Italiana Nell'Olimpo Dei PLC" Article published in Automazione, May 1995, 8 pages.
Bellini. "Sistemi di automazione modulari per I settori industriali", Article published in Plast—Rivista Delle Materie Plastiche, Jul. 1996, 4 pages.
Idra Presse. "Manuale Delle Istruzioni Per L'Uso E La Manutenzione Della Macchina" MP 9200/850, 1998, retrieved Jun. 4, 2014, 8 pages.
Moog. Images of Hydraulic Machine HT400 Series, made in 1993 by Realpres srl, now property of Plastic P.B. di Pozzi Luigi & C s.n.c., retrieved Jun. 4, 2014, 8 pages.
Moog. Images of two Hydraulic Machines HT900 Series, made in 1994 and 1996 by Realpres srl, now property of BDM Riflex s.p.a., retrieved Jun. 4, 2014, 12 pages.
Microset. "Aggiornamento: Emissione release 1.06 del sistema operativo PLC MARS. Emissione release 2.03 del sistema operativo PLC Zeus real time. Emissione release 2.11 del sistema di programmazione SPM." customer memo dated Jan. 1, 1997, 2 pages.
Aboutabl. "Temporally Determinate Disk Access: An Experimental Approach", Technical Report, Measurement and Modeling of Computer Systems, 1997, retrieved Jun. 4, 2014, 18 pages.
Molano, et al. "Real-time Filesystems: Guaranteeing Timing Constraints for Disk Accesses in RT-Mach" Proceedings., The 18th IEEE Real-Time Systems Symposium, Dec. 2-5, 1997, 14 pages.
European Search Report dated Nov. 10, 2014 for European Application No. 13001346.9—1807 / 2629162, 9 pages.
Beckhoff, "Beckhoff TwinCat System Handbuch", Total Windows Control and Automation Technology, Apr. 13, 1999, XP-002730630. Retrieved on Nov. 17, 2014, 26 pages.
Allen-Bradley, "MicroLogix 1200 and MicroLogix 1500 Programmable Controllers" (Bulletins 1762 and 1764). Nov. 2011, 34 pages, XP002730631. Retrieved from the Internet: URL:http://support.elmark.com.pl/rockwell/Literatura/1762-RM001C-EN-P.pdf. Retrieved on Nov. 17, 2014, 34 pages.
European Search Report dated Aug. 9, 2011 for European Application No. 10013013.7—1239 / 2302473, 10 pages.
European Office Action dated May 27, 2014 for European Application No. 10013013.7, 5 pages.
Office Action dated Apr. 23, 2015 for U.S. Appl. No. 13/115,891, 58 pages.
Office Action dated Mar. 13, 2015 for U.S. Appl. No. 13/801,886, 98 pages.
Office Action for U.S. Appl. No. 13/115,891, dated Oct. 8, 2015, 58 pages.
Notice of Allowance for U.S. Appl. No. 13/115,891, dated Jul. 14, 2016, 111 pages.
European Search Report dated Mar. 20, 2006 for European Application Serial No. EP05018320, 5 pages.
OA dated Oct. 2, 2007 for U.S. Appl. No. 11/381,321, 15 pages.
OA dated Jan. 8, 2009 for U.S. Appl. No. 11/381,321, 13 pages.
OA dated Aug. 4, 2009 for U.S. Appl. No. 11/381,321, 15 pages.
Office Action dated Dec. 22, 2003 for U.S. Appl. No. 09/918,177, 11 pages.
Office Action dated Sep. 29, 2005 for U.S. Appl. No. 10/924,230, 11 pages.
Office Action dated Aug. 11, 2007 for EP Application Serial No. 02016631.0, 8 pages.
Office Action dated Mar. 1, 2007 for EP Application Serial No. 05018320.1, 4 pages.
Office Action dated Jun. 26, 2008 for EP Application Serial No. 07008882.8, 4 pages.
OA dated Jun. 21, 2010 for U.S. Appl. No. 11/381,321, 22 pages.
OA dated Mar. 31, 2008 for U.S. Appl. No. 11/381,321, 14 pages.
OA dated Dec. 22, 2010 for U.S. Appl. No. 11/381,321, 21 pages.
Notice of Allowance dated Jan. 30, 2006 for U.S. Appl. No. 10/924,230, 5 pages.
Rockwell Automation. "1747 Open Controller System Overview (Catalog No. 1747-OC series)", May 1997, 28 pages.
Notice of Allowance for U.S. Appl. No. 13/801,886, dated Jul. 6, 2015, 52 pages.
Office Action dated Aug. 5, 2013 for U.S. Appl. No. 13/115,891, 38 pages.
Office Action dated Jul. 18, 2013 for U.S. Appl. No. 13/801,886, 43 pages.
Rockwell Software. "Getting Results with RSLogix 500", published Jul. 1997, United States, 76 pages.
CJ International. "ISaGRAF Version 3.4 User'S Guide", published Jan. 1, 2000, France, 428 pages.
Siemens. "SIMATIC 545/555/575 Programming Reference User Manual", Order Number: PPX:505-8204-2,Manual Assembly No. 2806090-0002, Second Edition, Feb. 24, 2000, published online at [http://cache.automation.siemens.com/dnl/jY0NzkzAAAA__17514825_HB/505-8204-2.pdf], 593 pages.
Office Action dated Jun. 18, 2014 for U.S. Appl. No. 13/801,886, 53 pages.
Office Action dated Apr. 23, 2014 for U.S. Appl. No. 13/115,891, 41 pages.
Notice of Opposition to a European Patent filed by 3S-Smart Software Solutions GmbH on Jun. 3, 2014 for European Patent No. 1282020, 5 pages.
Plagemann, Bernhard. "The Industrial PC in Automation Technology" Huthig, 1997, retrieved Jun. 3, 2014, 69 pages.
Notice of Opposition to a European Patent filed by ABB AG on Jun. 3, 2014 for European Patent No. 1282020, 15 pages.
ABB. Handbook: "ABB Procontic T300 Systembeschreibung Mehrprozessorsteuerungssystem Hardware", issued Oct. 1992, 16 pages.
ABB. Handbook: "ABB Procontic T300 System Description Multiprocessor Control System General Part", issued Nov. 1990, 30 pages.
Intel. Handbook: "iRMX 86 Basic I/O System Reference Manual", issued 1982, retrieved Jun. 3, 2014, 56 pages.
Smart Software Solutions GmbH. "Handbuch zur SPS-Programmentwicklung mir CoDeSys2.2", issued 2001, retrieved Jun. 3, 2014 8 pages.
ABB. "LAF Users Guide, RTU 200", issued 1994, retrieved Jun. 3, 2014, 54 pages.
Notice of Opposition to a European Patent filed by Beckhoff Automation GmbH on Jun. 4, 2014 for European Patent No. 1282020, 5 pages.
Rockwell Automation. Handbook: "1747 Open Controller System Overview", issued May 22, 1997, 28 pages.
Controlware Technologies Corporation. Handbook: "Controlware: Advanced Components for Automation Solutions—Technical Evaluation Guide", issued Mar. 1997, 64 pages.
Beckhoff. Handbook: "Eine Einleitung in PC Control", issued Nov. 16, 1998, 16 pages.
Beckhoff. Handbook: "TwinCAT System", issued Nov. 16, 1998, 21 pages.
Beckhoff. Handbook: "TwinCAT—PLC Systembausteine", issued Apr. 13, 1999, 27 pages.
Notice of Opposition to a European Patent filed by Bosch Rexroth AG on Jun. 3, 2014 for European Serial No. 1282020, 25 pages
Bosch. "BAPS3 Programmieranleitung Software-Handbuch", Ausgabe 102, Jan. 1999, 78 pages.
Bosch. "CPL Programmierhandbuch", Ausgabe 109, Mar. 2000, 56 pages.

(56) References Cited

OTHER PUBLICATIONS

Notice of Opposition to a European Patent filed by Festo AG & Co. KG on Jun. 4, 2014 for European Serial No. 1282020, 27 pages.
Wilhelms, Michael. "Prozesssteuerung und Visualisierung mit WinLab: Messen, Steuern, Regeln Und Visualisieren unter Windows", Feldkirchen: Franzis (Bookware), ISBN 3-7723-4342-2, 1996 Franzis-Verlag GmbH, 85622 Feldkirchen, retrieved Jun. 3, 2014, 31 pages.
Beck Gmbh. "Beck Automation Office—FST Software CD: FST IPC PLC Operating System Version 2.22" (PN: 189 531) Edition 99/01, issued 1999, retrieved Jun. 4, 2014, 11 pages.
Festo. "The CPU modules E.IPC-HC 15 /HC 16 /HC 17", HC15FEEN, Version 3.1 as of Oct. 31, 1995, 2 pages.
Holder, et al. "Der Industrie-PC in der Automatisierungstechnik", Heidelberg: Huthig, 1999, ISBN 3-7785-2715-0, retrieved Jun. 4, 2014, 5 pages.
Notice of Opposition to a European Patent filed by KEBA AG on Jun. 4, 2014 for European Patent No. 1282020, 5 pages.
Wells, et al. Die Deutsche Bibliothek, "Das LabVIEW-Buch", Prentice Hall, 1996, ISBN: 3-872-9540-8, retrieved Jun. 4, 2014, 340 pages.
Siemens. "SIMATIC CP 581 Handbuch" Siemens AG, Ausgabe 02, Apr. 1999, 462 pages.
Notice of Opposition to a European Patent filed by Moog Inc. on Jun. 4, 2014 for European Patent No. 1282020, 8 pages.
"SPM Programming System Microset Rev. 2.09—Programming Manual", Dec. 1996, 304 pages.
Boterenbrood. "PLC-CAN Interface for the ZEUS MicroVertex Detector (MVD) Cooling System" Feb. 19, 2001, User Documentation Version 1.4, 21 pages.

\* cited by examiner

METHOD FOR CONSISTENT STORAGE OF DATA IN AN INDUSTRIAL CONTROLLER

RELATED APPLICATIONS

This application is a continuation of, and claims priority to, U.S. patent application Ser. No. 13/115,891, filed on May 25, 2011, and entitled "METHOD FOR CONSISTENT STORAGE OF DATA IN AN INDUSTRIAL CONTROLLER," which is a continuation of U.S. patent application Ser. No. 11/381,321 filed May 2,2006, which is a divisional of U.S. patent application Ser. No. 10/924,230, filed on Aug. 23, 2004 (issued as U.S. Pat. No. 7,065,415), which is a divisional of U.S. patent application Ser. No. 09/918,177, filed on Jul. 30, 2001 (issued as U.S. Pat. No. 6,801,813). The entireties of these applications are incorporated herein by reference.

TECHNICAL FIELD

The present invention generally relates to industrial control systems and in particular to providing a file system on an industrial controller and a system and methods for employing the file system.

BACKGROUND OF THE INVENTION

Industrial controllers are special purpose computers used for controlling factory automation devices. Under the direction of a stored program, a processor of the industrial controller examines a series of inputs reflecting the status of a controlled process or device and changes outputs affecting control of the controlled process or device. Generally industrial controllers are constructed in modular fashion to accommodate different applications requiring different numbers and types of input/output (I/O) circuits as is determined by the particular device or process being controlled. The stored control program runs in real-time to provide outputs to the controlled process as electrical signals to outputs such as actuators and the like. The outputs are based on the logic of the control program and inputs received from sensors of the controlled process.

The industrial controller or programmed logic controller (PLC) executes a series of operations that are performed sequentially and repeatedly. In general, the series of operations includes an input scan, a program scan and an output scan. During the input scan the PLC examines the on or off state of the external inputs and saves these states temporarily in memory (e.g., a file). During the program scan the PLC scans the instruction of the program and uses the input status to determine if an output will be energized. The output results are then saved to memory (e.g., a file). During the output scan the controller will energize or de-energize the outputs based on the output results stored in memory to control the external devices.

A conventional language for programming the stored program is relay ladder logic. Each ladder logic program comprises one or more ladder logic statements, referred to as rungs or instructions. The ladder logic statements define relationships between an output variable and one or more input variables. Input variables are variables that correspond to signals at input terminals and output variables are variables that correspond to signals at output terminals. In relay ladder logic, the input and output signals may be represented graphically as contact symbols and coil symbols arranged in a series of rungs spanning a pair of vertical power rails. A typical ladder logic statement may indicate that a specific output variable is "on" if and only if a first and a second input is "on".

The ladder logic program not only manipulates single-bit input and output data representing the state of the sensing and operating devices, but also performs arithmetic operations, timing and counting functions and more complex processing operations. A ladder program can be created by connecting a special input module to a PLC that includes a small keyboard and entering ladder logic statements directly into the memory of the PLC. Another method of creating a ladder logic program involves, utilizing a ladder logic program development/editor tool residing on a separate device, such as a personal computer. An operator or programmer of the personal computer draws a series of ladder logic graphs representing each rung or instruction directly on the computer display screen. Once the ladder logic program is complete, the PC software converts the graphs into the corresponding ladder logic commands. The ladder logic command are then transferred to the PLC and stored in the PLC memory.

A PLC and/or a personal computer device can store one or more ladder logic programs and versions. However, a user must manually upload and download ladder logic programs at a work station or personal computer running a developer/editor application program. The current program running on the industrial controller can only be selected and/or changed by the editor. Data backup, storage and trend data is invoked through an application program and stored on a RAM residing on the industrial controller. The size of the RAM is limited and can eventually overload. An operator must periodically upload the data to remove it from the industrial controller memory to avoid overloading. Additionally, a program may include different profiles (e.g., different recipes) and associated parameters regarding particular implementations of a process. Conventionally, these different profiles are stored in huge dimensional arrays within the application program utilizing the memory of the industrial controller.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and method for providing a file system on an industrial controller. The file system allows industrial control programs to implement many functions previously performed within the industrial control program and stored in the same memory as the industrial control program. An execution engine is adapted to interpret new instructions that invoke the services of the file system. An editor is also provided that allows a user to include instructions interpretable by the execution engine employing services of the file system. The execution engine, the file system and the running industrial control program (e.g., ladder logic program) provide the functionality for loading user defined routine files at run-time from any file location, such as a memory device residing on the industrial controller, on a local server or at a remote location. Additionally, recipe files can be loaded and unloaded at real-time. A recipe file is a profile and the associated parameters regarding a particular implementation of a process (e.g., different paint types, different cookie types). The recipe files can reside on a memory device residing on the industrial controller, on a local server or at a remote location.

The execution engine also interprets instructions in the running industrial control program for logging measured data and trend data to a file at a memory device residing on the industrial controller, on a local server or at a remote location automation using the file system services. The file system services can also be employed to retrieve the measured data and trend data. The file system services allow selection of a running program from a plurality of application programs residing on the industrial controller. The selection can be invoked by sending a communication command from a remote or local location. Additionally, one or more operating systems can be provided in one or more files and a particular operating system selected to execute on the industrial controller corresponding to the development of the running industrial control program. The operating system can be stored as a file along with the industrial control program or the user defined routines. Multiple versions of the operating system can be stored to provide a "dual boot" situation The following description and the annexed drawings set forth in detail certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention will now be described with reference to the drawings. The present invention will be described with reference to a system and method for employing a file system and file system services on an industrial controller. An execution engine is provided that interprets instructions included in an industrial control program. The instructions utilize services in the file system for including user defined routine files loaded from local or remote locations, to load and unload recipe files from local and remote locations, to log and retrieve measured data and trend data to files at local or remote locations, to select different operating systems and to select a running program from a plurality of running programs utilizing the file system. It is to be appreciated that a number of other functions and services can be employed utilizing the services of the file system in accordance with the present invention. Although the present examples will be illustrated with respect to an implementation using ladder logic programs, other industrial control programming languages can be employed and still fall within the scope of the present invention and appended claims.

The present invention provides a system for multiple files on a single device. The file system provides a common interface for all non-volatile storage devices, such as CompactFlash cards, Windows CE platforms and hard drives that access the file system through a set of common services, such as Get File Information, Read File, Write File, Create File, Delete File, Open File, Close File, etc. The present invention provides for multiple types of data to be stored such as user programs, data logging, recipe storage, operating system updates and program transfers. The present invention supports lean manufacturing by allowing quick reconfiguring of manufacturing environments, allowing user's to load a specific application into the controller "on demand" without downloading from programming software and allows user's to purchase smaller memory processors.

Figure 1:
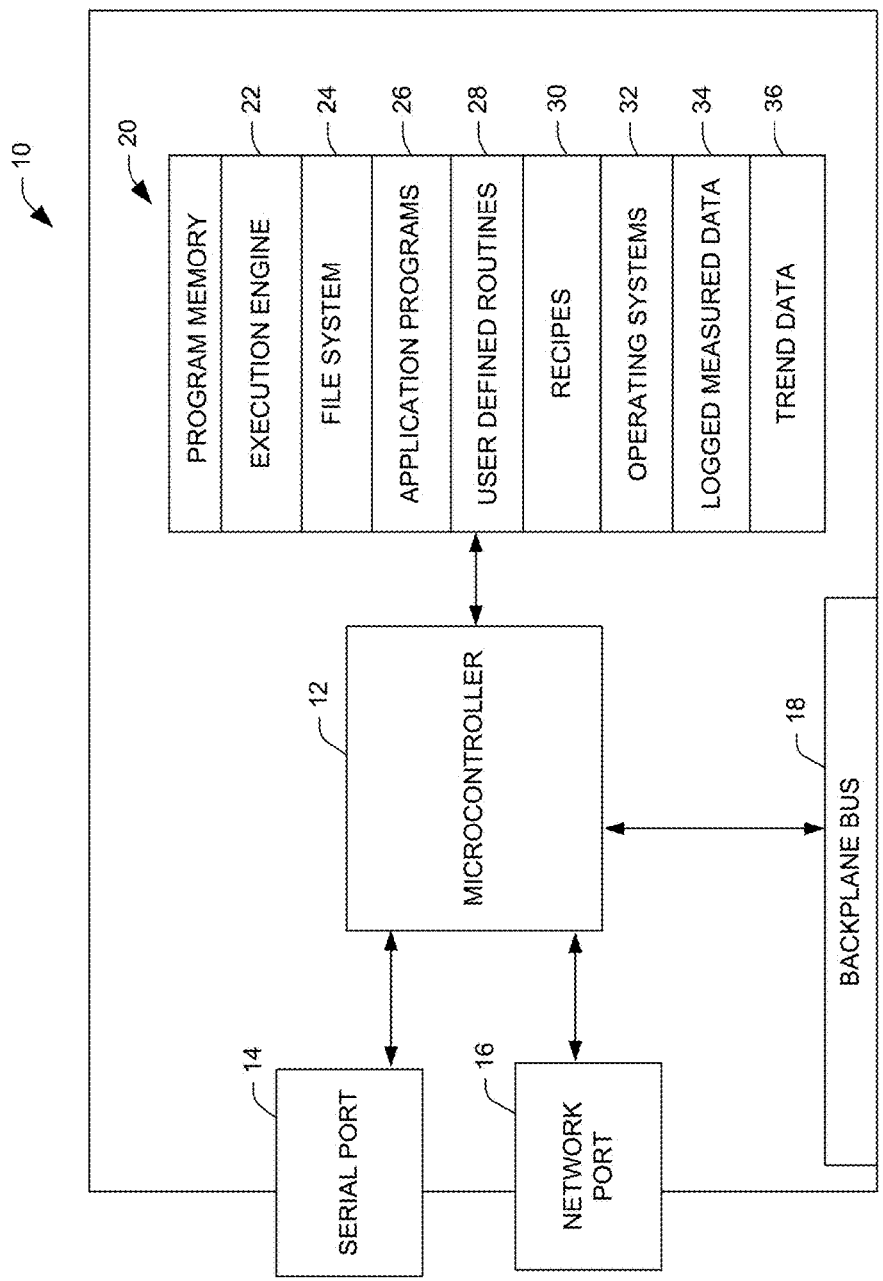
FIG. 1 illustrates a block schematic diagram of an industrial controller employing a file system in accordance with one aspect of the present invention.

FIG. 1 illustrates an industrial controller 10 having a file system 24 stored in a program memory 20. The file system 24 can be accessed through a set of common file services. For example, the set of common file services can include services such as Get File Information, Read File, Write File, Create File, Delete File, Open File, Close File, etc. The file system 24 can include a file manager that includes functions for managing the files, such as moving, deleting and copying files. An application program residing on the industrial controller can utilize the file system to perform a variety of functions previously performed within the application program or through an editor. The industrial controller 10 includes a serial port 14 and a network port 16 both coupled to a microcontroller 12. The serial port 14 and network port 16 provides a communication link to remote devices. The microcontroller 12 is also coupled to a backplane bus 18 for providing instructions and receiving inputs from I/O modules. The program memory 20 provides the microcontroller 12 with the execution code necessary to communicate to other devices through the serial port 14, the network port 16 and the backplane bus 18. The program memory also includes the algorithms and calculations necessary for the particular process that the industrial controller is controlling.

The program memory 20 includes an execution engine 22 that performs the main initialization routines of the industrial controller 10 and other devices that the industrial controller 10 communicates with and controls. The execution engine 22 is also the main interface to remote devices. The execution engine in cooperation with a file system 24 allows remote devices to select a particular application program to execute from amongst a plurality of application programs 26. The execution engine 22 is adapted to interpret instructions supplied by the application program including instructions that perform access to one or more files services in the file system 24. Typically, these instructions are written by an editor in ladder logic, which is then converted to programmable logic controller (PLC) instruction code.

The application programs 26 can employ the file system 24 to perform a variety of functions previously performed within the application programs. For example, one or more user defined routine files 28 can be loaded or linked at runtime by including a file system service command within the application program. The user defined routine files 28 can be one or more libraries, such as a math library or a communication library. Additionally, one or more recipe files 30 can be loaded through the application program employing a file system service. A recipe file is a profile and associated parameters regarding a particular implementation or process. For example, one recipe can be for mixing ingredients for a certain type of paint (e.g., water based paint), while another recipe can be for a different type of paint (e.g., oil based paint). Different recipes can be loaded upon a change in one or more parameters during execution of the application program. Using new instructions, recipes can be loaded and recorded to and from non-volatile memory as a file. A new recipe can be loaded into the same memory space as the previous recipe to save RAM space. Since the user defined routine files 28 and the recipe files 30 are stored in separate files from the application program, the user defined routine files 28 and the recipe files 30 can be stored in a different memory device than the executing application program. The different memory device or devices can reside on the controller 10 or on a remote device, thus reducing the size of the memory that needs to reside on the controller 10. The execution engine 22 is adapted to load the user define routine files and the recipe files upon receipt of a proper instruction from an executing application program.

The program memory 20 can also include one or more operating system files 32. For example, one application may be developed on a first operating system platform and another application program may be developed on a second operating system platform. The different application programs may not operate correctly or optimally on different operating system platforms. The basic services of the operating system is provided in one or more files. Therefore, when an application program is saved, a copy of the operating system can be saved along with the application program. The operating system and application program can be loaded together when moving an application program from one industrial controller to another to assure compatibility of the operating system and the executing application program running on the controller. The execution engine 22 or the application program can invoke the proper operating system for execution of the application program. The different operating system files 32 can reside on a separate memory device from the application programs at a local or remote location with respect to the industrial controller 10.

Another function that application programs perform utilizing services of the file system 24 is data logging and data retrieval. For example, logged measured data 34 and trend data 36 each can be logged in one or more files. Logged measure data can include continuous temperature measurements that were conventionally stored in the same RAM that the application program was executing. Trend data includes monitoring differences (e.g., temperature differences) over time. Eventually, the capacity of the RAM is reached and no new temperature data can be stored in the RAM. However, the present invention eliminates this problem by storing the temperature data to a file that can be located on another memory device at a local or remote location. The one or more files can be stored in a separate memory device from the memory on which the application program executes. The separate memory device can reside at a remote location, such that data can be stored at one or more locations over a network. The data can also be accessed by the application program through the file system services 24. The execution engine 22 interprets the appropriate logging and retrieval instruction from the application program and calls one or more functions within the file system 24 to perform the requested data logging and retrieval.

Figure 2:
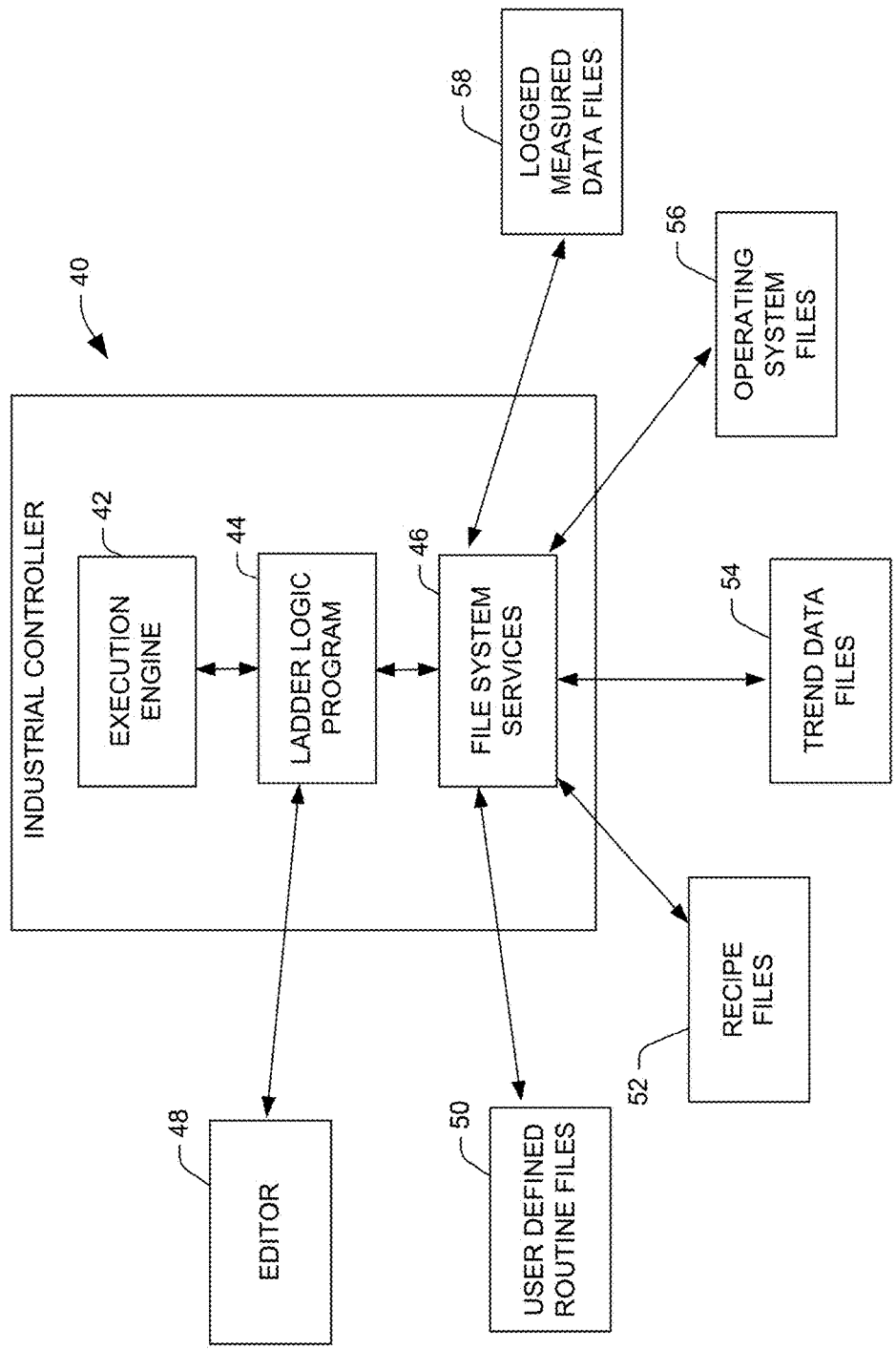
FIG. 2 illustrates a block diagram of an industrial controller employing a file system to access files remote from the industrial controller in accordance with one aspect of the present invention.

Referring to FIG. 2, an industrial controller 40 includes an execution engine 42, a ladder logic program 44 and a plurality of file system services 46. The execution engine 42 is adapted to interpret instructions within the ladder logic program 44 including instructions that perform access to one or more files system services 46. The ladder logic program 44 uses one or more services to access user defined routine files 50, recipe files 52 and operating system files 56. The ladder logic program 44 also employs one or more file system services 46 to log and access trend data files 54 and measured data files 58. The ladder logic program 44 and the file system services 46 reside and execute on a random access memory (RAM) residing on the industrial controller 40. The user defined routine files 50, the recipe files 52 and the operating system files 56 reside at a separate memory location from the RAM of the industrial controller 40. The ladder logic file 44 employs the file system services 46 to load one or more user defined routine files 50, a particular recipe file 52 having parameters associated with the particular implementation of the process to be performed and an operating system file 56 if the application program was developed under a different operating system that the one currently being used. The one or more loaded user defined routine files 50, the particular loaded recipe file 52 and the loaded operating system file 56 are then loaded into the RAM for execution. During execution of the ladder logic program 44, measured data and trend data can be stored in one or more measured data files 58 and one or more trend data files 54.

An editor 48 is provided that allows a user to develop, load, unload, edit or delete one or more ladder logic programs to the industrial controller 40. The editor 48 is adapted to allow a user to insert and edit instructions for employing one or more file system services 46. The editor 48 includes instructions for including one or more user defined routine files 50, for including an operating system file from amongst one or more operating system files 56 and for including one or more recipe files 52 in the ladder logic program 44. The editor 48 is also adapted to allow a user to insert and edit instructions for logging and retrieval of measurement data 58 and trend data 54 in the ladder logic instructions. The editor 48 can then convert the instructions in the ladder logic into instructions understandable and executable by the execution engine 42. Optionally, an operating system file corresponding to development of the ladder logic program can be saved along with the ladder logic program and loaded onto the industrial controller 40 to assure the executing program and the operating system of the industrial controller are compatible.

Figure 3:
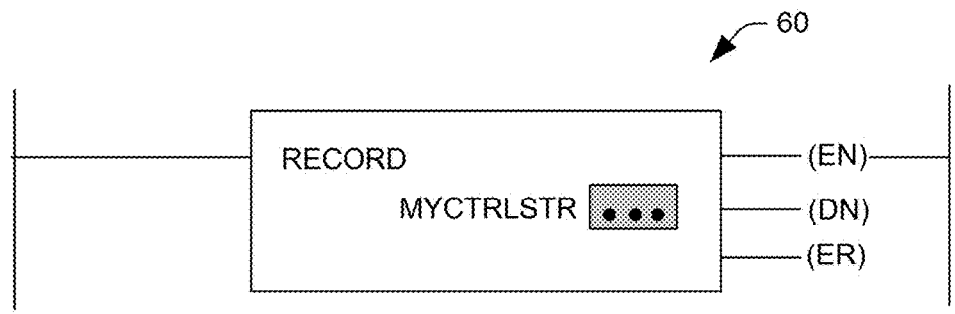
FIG. 3 illustrates an example of a record instruction for implementing into a ladder logic program in accordance with one aspect of the present invention.
Figure 4:
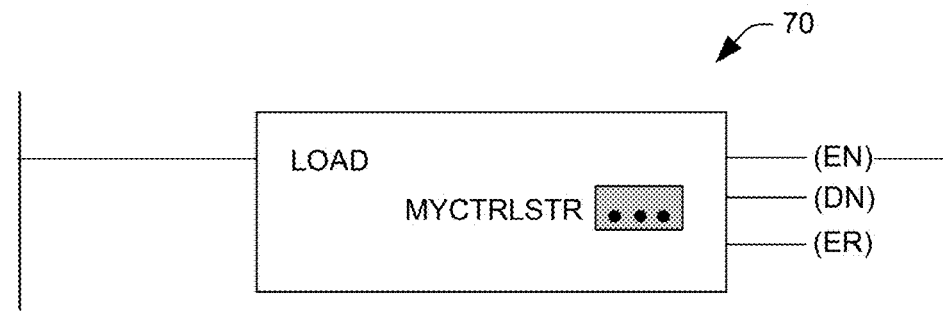
FIG. 4 illustrates an example of a load instruction for implementing into a ladder logic program in accordance with one aspect of the present invention.

As stated above, an editor is provided with a plurality of available instructions for utilizing the file system in accordance with the present invention. FIG. 3 illustrates an example of a ladder data record instruction 60 in accordance with an aspect of the present invention. The ladder data record instruction 60 can be inserted into a ladder logic program during program development. On a rung transition, the record instruction can open a connection to a target storage file manager object and file and append the specified data record to the data already in the file. The variables associated with the record instruction include a pointer to the data to send, the size of the data, the path to the file manager or managers, which file manager and the specific file to append the specified data record. FIG. 4 illustrates a ladder data load instruction 70 in accordance with an aspect of the present invention. The ladder data load instruction 70 can be inserted into a ladder logic program during program development. On a rung transition, the load instruction can open a connection to a target storage file manager object and file and load the specified data record to the specified location. The variables associated with the record instruction include a pointer to the location to fill, the size of the data, the path to the file manager or managers, which file manager and the specific file containing the specified data record.

Figure 5:
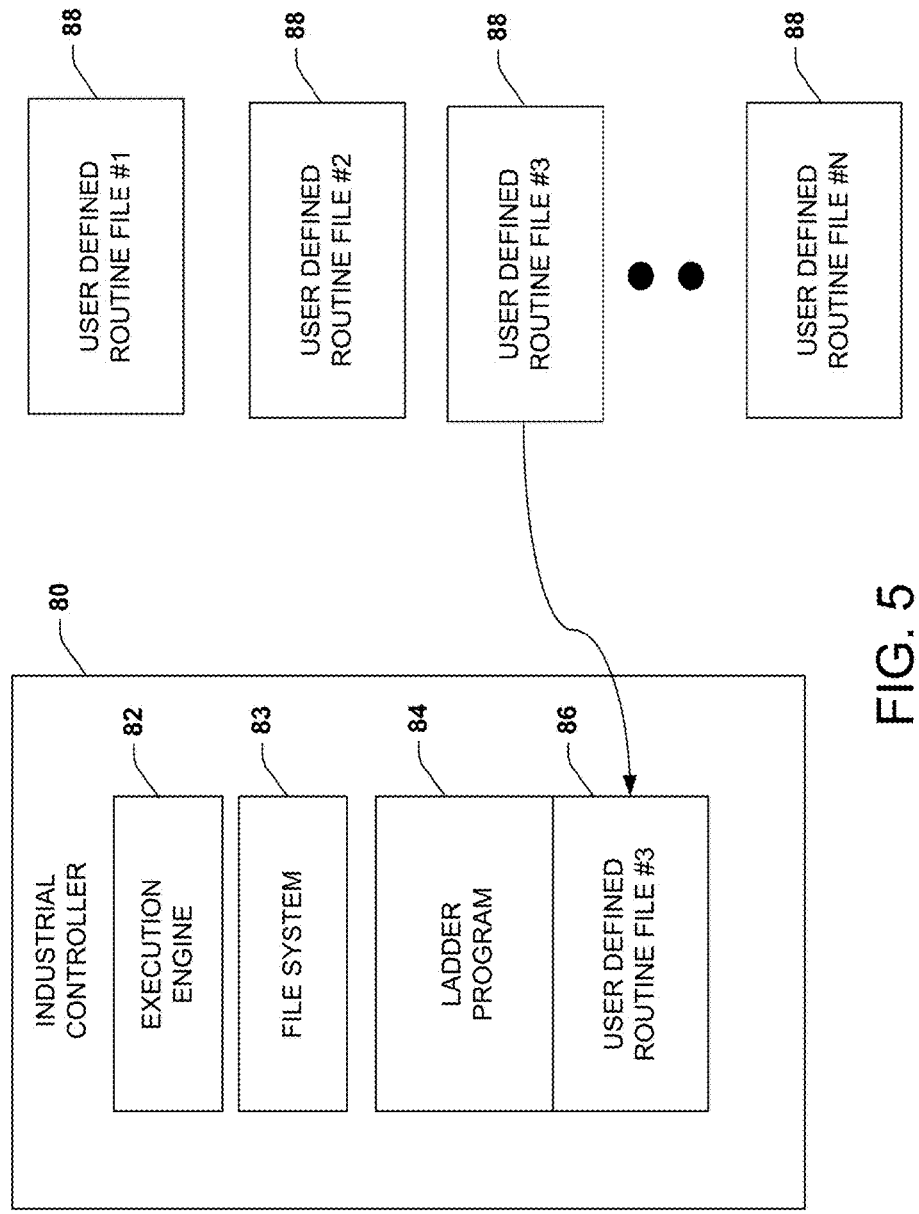
FIG. 5 illustrates a block diagram of an industrial controller loading a user defined routine file in accordance with one aspect of the present invention.

FIG. 5 illustrates an industrial controller including an execution engine 82, a ladder program 84 and a user defined file 86. Upon invocation of an execute command received by the execution engine 82, the execution engine 82 loads the ladder program 84 into random access memory (RAM), while scanning the program for any header commands specifying one or more user defined files 88 to include in the execution of the ladder program 84. The execution engine then loads a copy 86 of the user defined file 86 into the same memory location as the ladder program 84. In the present example, the execution engine selects user defined file #3 from a plurality of user defined files 88 labeled 1-N. Once the user defined files are loaded into the same memory location as the ladder program 84, the ladder program 84 can be executed. It is to be appreciated that more than one user defined file can be included within the ladder program 84.

Figure 6:
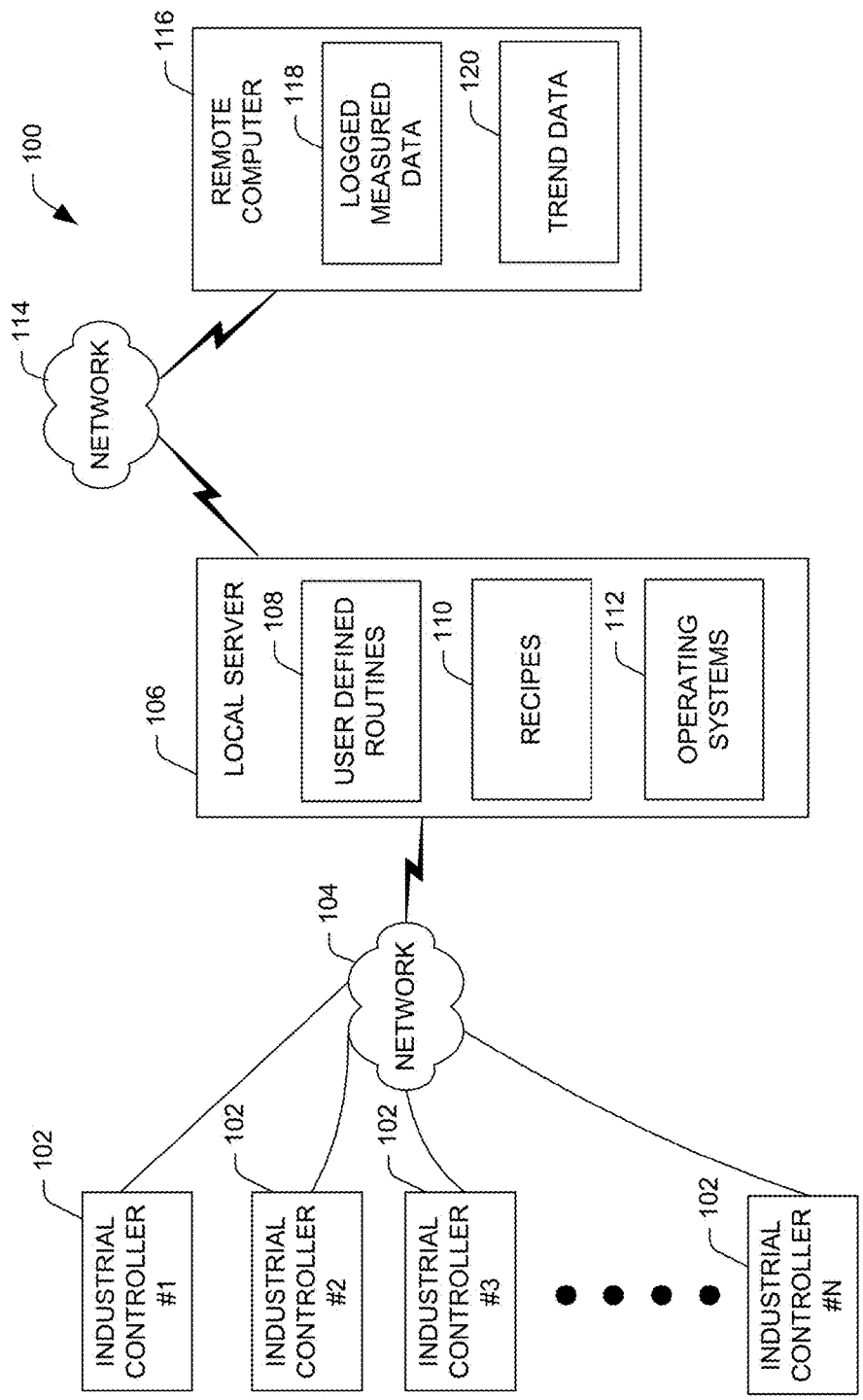
FIG. 6 illustrates a block schematic diagram of an industrial controller interacting with a remote and a local server in accordance with one aspect of the present invention.

FIG. 6 illustrates a system 100 including a plurality of industrial controllers 102 that each implements a file system in accordance with one aspect of the present invention. One or more user defined routine files 108, one or more recipe files 110 and one or more operating system files 112 reside on a local server 106. The local server 106 is coupled to one or more industrial controllers 102 through a first network 104 (e.g., local network, factory network). The first network 104 allows each of the one or more controllers 102 access to the user defined files 108, the recipes 110 and the operating system files 112 through the respective file system residing on the industrial controller 102. Therefore, the size of the memory needed on the industrial controller 102 is reduced by providing the user defined routines 108, the recipe files 110 and the operating system files 112 on a separate memory as opposed to residing on the RAM of the industrial controller 102. Additionally, a single set of user defined files 108, recipe files 110 and operating system files 112 can be employed by each industrial controller 102.

A remote computer 116 is coupled to the local server 106 through a second network 114 (e.g., company intranet, Internet). The remote computer 116 provides a medium in which logged measured data 118 and logged trend data 120 can be stored and accessed for each of the industrial controllers 102 at one or more factory locations. Each of the industrial controllers 102 store and access both measured and trend data utilizing a file system residing on a respective controller 102. Therefore, data can be stored at a remote location automatically instead of in the RAM of the respective controller reducing the size of the memory needed on the industrial controller 102. Also, a single location for all of the data can be provided so that data can be consolidated, aggregated and analyzed for one or more of the industrial controllers 102. It is to be appreciated that the logged measured data 118 and the trend data 120 can reside at the local server 106 with the user defined routine files 108, recipe files 110 and operating system files 112. Alternatively, the user defined routine files 108, recipe files 110 and operating system files 112 can reside on the remote computer 116 with the logged measured data 118 and the trend data 120. In fact any of the user defined routine files 108, recipe files 110, operating system files 112, the logged measured data files 118 and trend data files 120 can reside on any of the RAM of the industrial controller 102, the local server 106 and the remote computer 116 employing the file system in accordance with the present invention.

Figure 7:
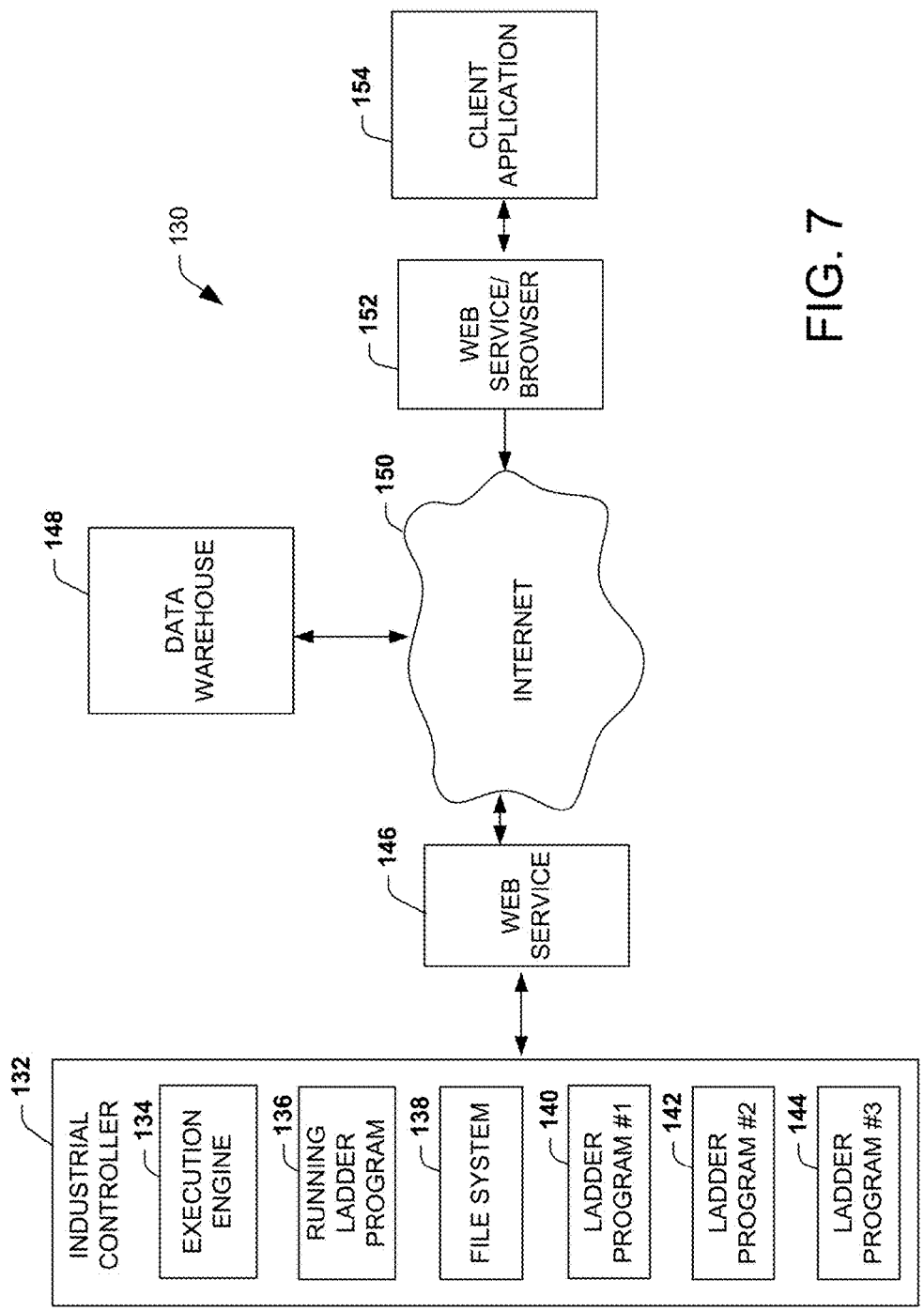
FIG. 7 illustrates a block schematic diagram of a client application accessing the industrial controller via the Internet in accordance with one aspect of the present invention.

FIG. 7 illustrates another example of a possible implementation employing the file system on an industrial controller in accordance with the present invention. A file system 138 resides on an industrial controller 132. The file system 138 is exposed to a web service 146, which allows communication to occur over the Internet 150. The industrial controller 132 includes an execution engine 134 and a running ladder program 136. The industrial controller 132 also includes a first ladder program 140, a second ladder program 142 and a third ladder program 144. A client application 154 is coupled to the Internet 150 via a web service and web browser 152, so that the client application 154 can communicate to the file system 138 over the Internet 150. The client application 154 utilize the file system 138 in conjunction with the execution engine 134 in selecting amongst one of the first ladder program 140, the second ladder program 142 and the third ladder program 144 to provide the running ladder program 136. The client application 154 can communicate a selection command to the file system 138, which informs the execution engine 132 the appropriate ladder program to make the running ladder program 136. The client application 154 can communicate through the Internet 150, for example, using TCP/IP protocol and invoke any or all of the services associated with the file system of the industrial controller 132 anywhere in the world via an Internet connection.

In the example of FIG. 7, the running ladder program 136 includes instructions, employing the file system 138 interpreted by the execution engine 134, for periodically downloading measured and trend data to a third party data warehouse 148 at another location different from the client application 154 and the industrial controller 132. The measured and trend data can then be stored and analyzed off-site, such that third party auditing and/or outsourcing can be provided. The running ladder program 136 can also access data through the data warehouse 148, such as measured data to calculate the trend data. It is to be appreciated that the communication for selecting a running ladder program can be through a local server or personal computer and data logging can performed at a local server or personal computer.

Figure 8:
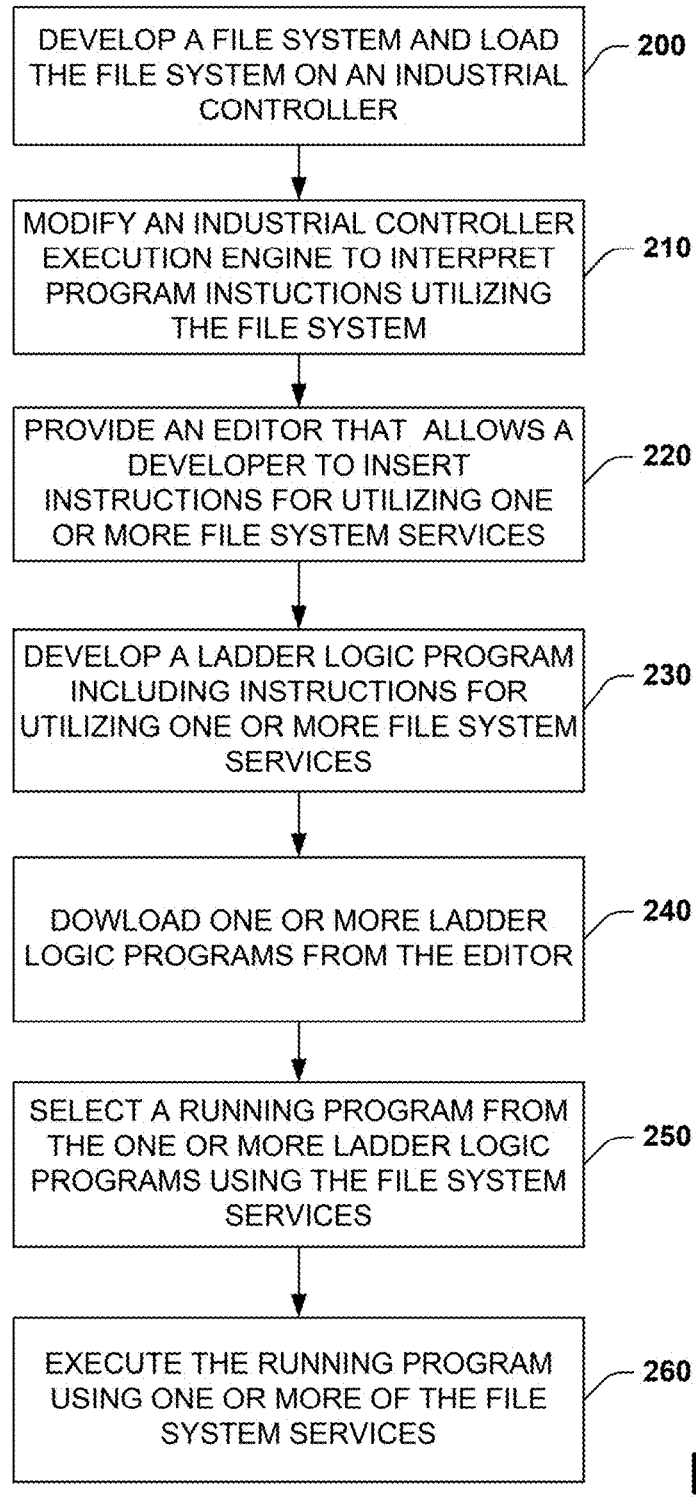
FIG. 8 illustrates a flow diagram of a methodology for providing an industrial controller with the functionality associated with utilizing a file system in accordance with one aspect of the present invention.
Figure 9:
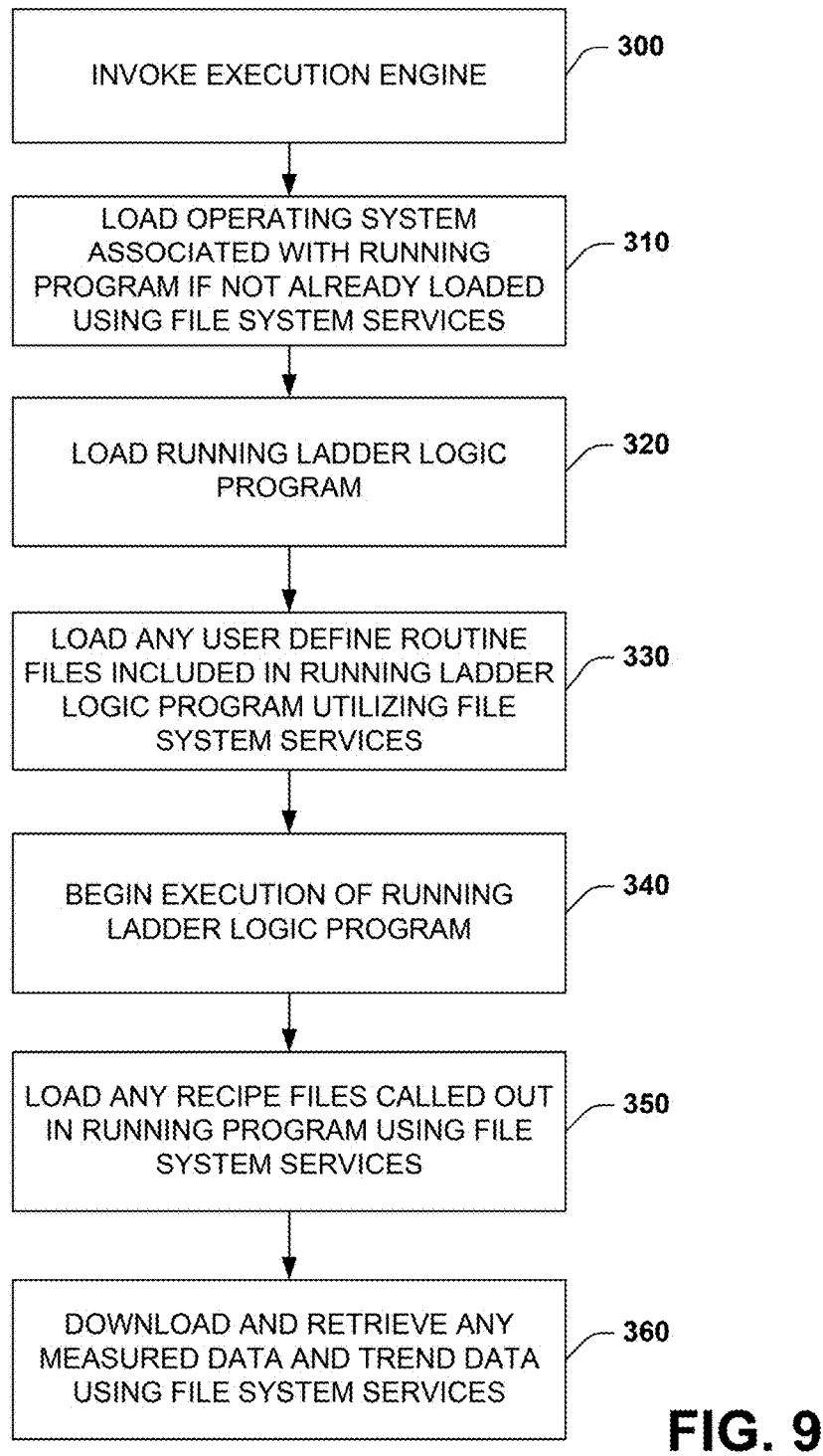
FIG. 9 illustrates a flow diagram of a methodology for executing an industrial control program utilizing a file system in accordance with one aspect of the present invention.

In view of the foregoing structural and functional features described above, a methodology in accordance with various aspects of the present invention will be better appreciated with reference to FIGS. 8-9. While, for purposes of simplicity of explanation, the methodologies of FIGS. 8-9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 8 illustrates one particular methodology for providing an industrial controller with the functionality associated with utilizing a file system in accordance with one particular aspect of the present invention. The methodology begins at 200 with the development of a file system adapted to operate on an industrial controller and the loading of the file system onto the industrial controller. An industrial controller execution engine is then modified or developed to interpret program instructions that utilize services of the file system at 210. A program development editor is then provided that allows a developer to insert instructions for utilizing one or more file system services at 220. At 230, a ladder logic program is developed including instructions for utilizing one or more file system services. At 240, one or more ladder logic programs are downloaded to the industrial controller from the editor. At 250, a running program is selected from the one or more ladder logic files having one or more instruction utilizing the file system services. The running program is then executed at 260 using one or more of the file system services.

FIG. 9 illustrates one particular methodology for executing an industrial control program utilizing a file system in accordance with one particular aspect of the present invention. The methodology begins at 300 with invocation of an execution engine. At 310, an operating system is loaded associated with the selected running program if the appropriate operating system is not loaded using the file system services. At 320, the running ladder logic program is loaded. At 330, any user defined routine files included in the running ladder logic program file are loaded utilizing the file system services. At 340, execution of the running ladder logic program begins. Any recipe files called out in the running ladder logic program are loaded by using the file system services at 350. At 360, any measured data and trend data called out in the running ladder logic program is downloaded or uploaded using the file system services.

The present invention has been illustrated with respect to a programming methodology and/or industrial controller architecture and a particular example, however, it is to be appreciated that various programming methodology and/or controller architectures suitable for carrying out the present invention may be employed and are intended to fall within the scope of the hereto appended claims.

The invention has been described with reference to various aspects of the present invention. Obviously, modifications and alterations will occur to others upon reading and understanding the foregone detailed description. It is intended that the invention be construed as including all such modifications alterations, and equivalents thereof.

What is claimed is:

1. A method, comprising:
sending, by industrial controllers using respective file system services, data collected by the industrial controllers to a remote server device via a web service, wherein the industrial controllers respectively control at least one automation device or process;
storing, by the remote server device, the data as aggregated data on a memory of the remote server device;
analyzing, by an auditing application executing on the remote server device, the aggregated data;
retrieving, via the web service by a subset of the industrial controllers using a corresponding at least one of the respective file system services, a subset of the aggregated data;
storing, by the subset of the industrial controllers, the subset of the aggregated data on one or more local memories of the subset of the industrial controllers;
retrieving, by the subset of the industrial controllers, an executable routine file from the remote server device or from another server device via the web service;
storing, by the subset of the industrial controllers, the executable routine file on the one or more local memories of the subset of the industrial controllers; and
executing, by the subset of the industrial controllers, the executable routine file.

2. The method of claim 1, further comprising sending, by the remote server device to a subset of the industrial controllers, selection data via the web service, wherein the selection data invokes a selected program, of a plurality of application programs stored on the subset of the industrial controllers, for execution on the industrial controller.

3. The method of claim 1, further comprising, in response to receipt, by the subset of the industrial controllers, of selection data sent by a web browser application via the web service to one or more of the file system services, initiating execution of a selected control program, of a plurality of control programs stored on the subset of the industrial controllers, identified by the selection data.

4. The method of claim 1, further comprising retrieving, by the subset of the industrial controllers using one or more of the file system services, a recipe file from the remote server device or from another server device via the web service.

5. The method of claim 4, further comprising:
loading, by the subset of the industrial controllers, at least one process parameter defined by the recipe file to one or more local memories of the subset of the industrial controllers; and
executing, by the subset of the industrial controllers, a control program in accordance with the at least one process parameter.

6. The method of claim 1, further comprising retrieving, by the subset of the industrial controllers, an operating system file from the remote server device or from another server device via the web service.

7. The method of claim 1, wherein a portion of the data comprises trend data generated by the subset of the industrial controllers or measured data obtained by the subset of the industrial controllers.

8. The method of claim 1, wherein the sending comprises sending at portion of the data in response to execution, by the subset of the industrial controllers, of a control program instruction that invokes one or more of the file system services implemented on the subset of the industrial controllers.

9. The method of claim 8, wherein the control program instruction is a ladder logic instruction.

10. A system, comprising:
a server device comprising a local memory and a processor, the server device configured to communicate with industrial controllers through a public network via a web service, the industrial controllers respectively controlling an industrial device or process, wherein
the server is configured to aggregate data received from the industrial controllers via the web service to yield aggregated data, and to perform auditing analysis on the aggregated data to yield an analysis result,
the data is sent to the server device by the industrial controllers via the web service using respective file system services,
the aggregated data is accessible to the industrial controllers via the web service, and the server device is further configured to store one or more executable routine files, and the one or more executable routine files are accessible to the industrial controllers via the web service.

11. The system of claim 10, wherein the server device is further configured to send, to a subset of the industrial controllers, selection data via the web service, wherein the selection data causes one or more of the file system services to invoke a selected program, of a plurality of application programs stored on the subset of the industrial controllers, for execution on the subset of the industrial controllers.

12. The system of claim 10, wherein the server device is further configured to store one or more recipe files, and wherein the one or more recipe files are accessible to the industrial controllers via the web service using the respective file system services.

13. The system of claim 10, wherein the server device is further configured to store one or more operating system files, and wherein the one or more operating system files are accessible to the industrial controllers via the web service.

14. The system of claim 10, wherein the data comprises at least one of time-series data generated by a subset of the industrial controllers or measured data obtained by the subset of the industrial controllers.

15. An industrial controller comprising:
a memory;
an execution engine; and
a file system storable in the memory and comprising a file system service;
wherein
the file system service is configured to, in response to execution of a control program instruction by the execution engine, send a set of data generated by the industrial controller to a remote server device via a web service,
the remote server device is configured to aggregate the set of data with other data received from one or more other industrial controllers to yield aggregated data and to perform an audit analysis on the aggregated data,
the file system service is further configured to retrieve a subset of the aggregated data from the remote server device via the web service and to store the subset of the aggregated data on a memory,
the file system service is further configured to retrieve, from the remote server device via the web service, an executable routine file stored on the remote server device and store the executable routine file on a local memory of the industrial controller, and
the execution engine is configured to execute the executable routine file to facilitate control of an automation device or process.

16. The industrial controller of claim 15, wherein the file system service is further configured to
receive, from the remote server device via the web service, selection data identifying a control program of a set of control programs stored on the memory, and
in response to receipt of the selection data, invoke the control program for execution on the industrial controller.

17. The industrial controller of claim 15, wherein the file system service is further configured to
retrieve, from the remote server device via the web service, a recipe file stored on the remote server device, and
retrieve, from the recipe file, one or more process parameters defined by the recipe file, and
wherein the execution engine is further configured to execute a control program in accordance with the one or more process parameters.

18. The industrial controller of claim 15, wherein the file system service is configured to send the set of data to the remote server device in response to execution, by the execution engine, of a control program instruction that causes the file system service to send the set of data.

19. The industrial controller of claim 15, wherein the file system service is further configured to, in response to receipt via the web service of selection data identifying a program of a plurality of application programs stored on the memory, execute the program.

20. The industrial controller of claim 15, wherein the file system service is configured to retrieve, via the web service, an operating system file from the remote server device or another remote device and to load the operating system file.

* * * * *